Aug. 7, 1928.
B. F. WALKER
HAND TRUCK
Filed Nov. 4, 1926
1,679,885
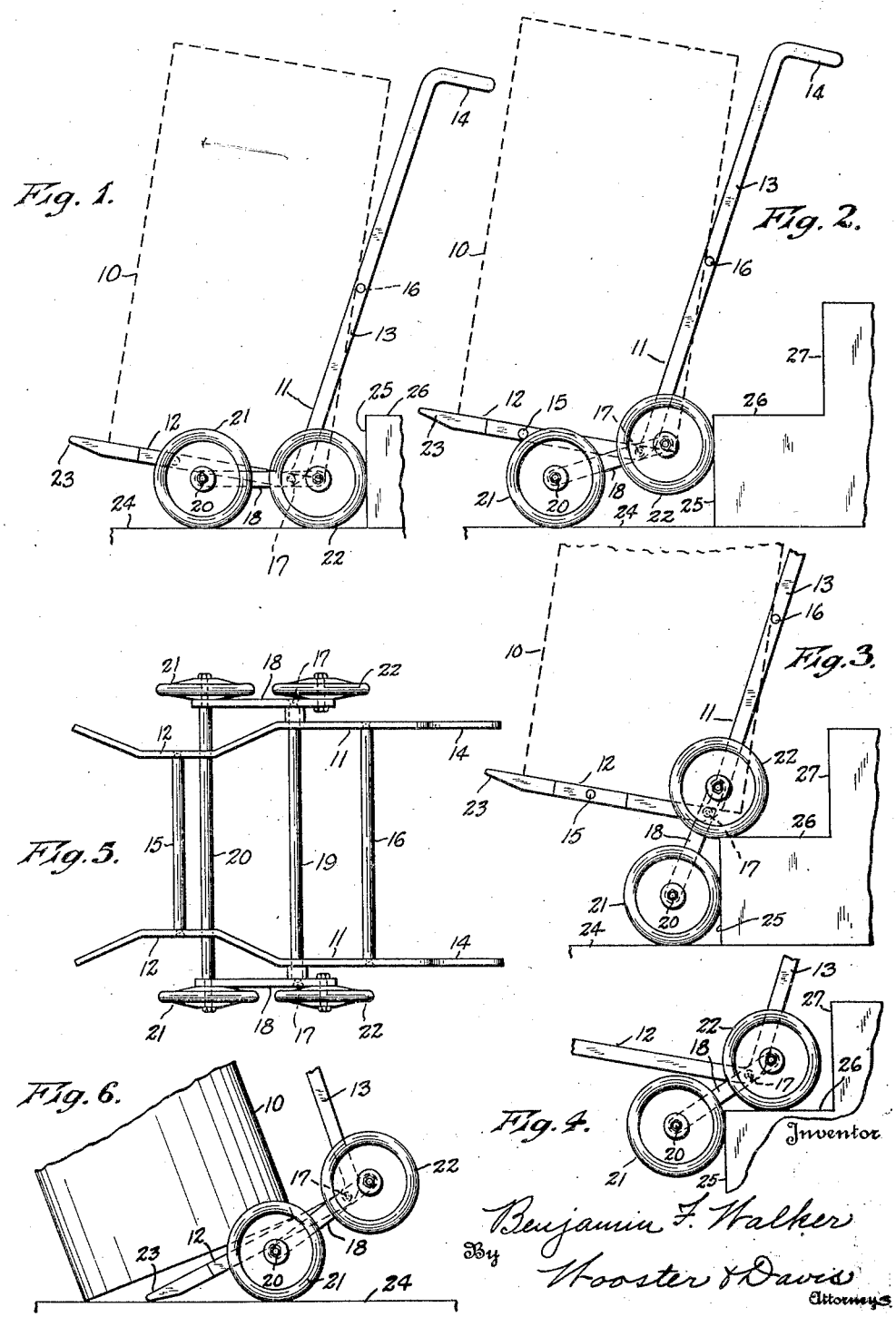

Patented Aug. 7, 1928.

1,679,885

UNITED STATES PATENT OFFICE.

BENJAMIN F. WALKER, OF BRIDGEPORT, CONNECTICUT.

HAND TRUCK.

Application filed November 4, 1926. Serial No. 146,155.

This invention relates to hand trucks, particularly to a truck of this character for carrying heavy weights, and has for an object to provide a truck which will make it easier to carry these weights up and down steps.

With the foregoing and other objects in view, I have devised the construction illustrated in the accompanying drawing forming a part of this specification. In this drawing, Fig. 1 is a side elevation of my improved truck showing its normal position and ready to start up a set of steps.

Fig. 2 is a side elevation showing the first movement of the truck.

Fig. 3 is a side elevation showing the position of the truck just as it passes over the edge of a step.

Fig. 4 is a side elevation of the lower part of the truck showing a later position after the position of Fig. 3.

Fig. 5 is a top plan view of the truck, and

Fig. 6 is a side elevation of the lower part of the truck showing how it may be tilted for insertion under the load.

Hand trucks have been devised for carrying heavy loads which have a pair of wheels on a common axis. In the use of such trucks they must be carefully balanced or a considerable portion of the load must be carried by the user, and in going up and down steps with a load, considerable difficulty is experienced as the entire load including the weight of the truck must be lifted by the operator, and immediately the wheels pass over the forward edge of a step they quickly run rearwardly on the top of the step and hit the riser of the next step with a heavy shock, which may spill or injure the material carried on the truck and is very uncomfortable to the operator.

To overcome these objections I provide a separate carriage pivoted to the body of the truck, which has supporting wheels located both forwardly and rearwardly of the pivot, and which operates in going up a set of steps to assist in lifting the load and also prevents banging of the wheels against the riser of an upper step as the wheels pass onto the next lower step. The truck shown in the drawing embodies this feature and is extremely simple in construction. It comprises a body for carrying the load, indicated as a can or barrel 10, such as an ash can, and the body comprises substantially L-shaped side members 11 having spaced substantially horizontally extending portions 12 and uprights 13 terminating in suitable handles 14. These members are connected together by suitable cross bars 15 and 16. The load, such as the barrel or can 10, may seat in an upright position on the horizontal portions 12 and rest against the transverse bars 16. This body is mounted on and carried by a carriage which is pivoted to this body at 17, preferably on the horizontal members 12 and adjacent the junction of these horizontal portions and the upright portions 13. In the construction shown on the drawing this carriage comprises side members 18 pivoted to the body by means of a cross bar 19 and connected by a second cross bar 20 spaced forwardly of the pivot bar 19, and this forward bar 20 is located under the side members 12 so as to form a support for the body forwardly of the pivots 17. The construction shown also has a pair of wheels 21 and 22 mounted on each side member, and these wheels are located respectively forwardly and rearwardly of the pivots 17.

It will be apparent that as the pivots 17 are adjacent the horizontal and upright portions of the body they are normally to the rear of the center of gravity of the weight, and therefore, the body of the truck and this weight is supported on the carriage by these pivots and the front cross bar 20 which is preferably so located as to be normally a short distance forwardly of the center of gravity. It will also be noted that as the members 12 merely rest on the top of the cross bar 20 the body member may be swung clockwise, as viewed in the drawing about the pivots 17, or the carriage may swing counterclockwise, as viewed in the drawing about these pivots, during which movement the front wheels 21 and the cross bar 20 will move downwardly away from the body.

The operation is as follows: The load, such as a can of ashes 10, may be easily placed on the truck, as indicated in Fig. 6, by merely tipping the can forwardly and then lifting upwardly and forwardly on the handles 14 to tip the truck about the axis of the forward wheels 21. This brings the front ends 23 of the side members of the body adjacent the ground so that they may be easily slid under the raised side of the can. The operator then has merely to pull rearwardly on the handles to raise the load to the position of Fig. 1, which action may be assisted by placing his foot on the cross bar 19 and forcing it downwardly. The load is then supported on the four wheels and may be rolled anywhere desired without the necessity of the operator carrying any of the weight. In turning corners the operator may tilt the truck forwardly slightly about the front wheels to lift the rear wheels from the ground, and the truck may then be turned easily in any direction desired as it is supported only on the two forward wheels. This construction also greatly facilitates the running of the loaded truck upwardly or downwardly over a set of steps. In Fig. 1 the truck has been run along the floor or sidewalk 24 to bring the rear wheels 22 against the front wall or riser 25 of the lower step. The operator then pulls upwardly and rearwardly on the handles 14 which raises the rear wheels 22, as shown in Fig. 2, so that they run upwardly on the front wall 25, and during this movement the carriage turns about the pivot 17 so that the front wheels 21 run along the floor 24. It will be obvious that, as the pivots 17 are substantially on the line joining the axes of the front and rear wheels, as soon as the rear wheels are raised from the floor the pressure of the front wall 25 of the step on these wheels will tend to force them upwardly and forwardly about the pivots 17. This action will tend to draw the front wheels rearwardly under these pivots, so that the presssure of the rear wheels against the front wall of the step, by tending to swing the carriage counterclockwise, as viewed in the drawing about the pivots 17, will assist in raising the weight carried on the truck, and the more the carriage swings about this pivot the greater will be its lifting effect on the body of the truck until the line between the front and rear wheels is substantially in line with the uprights 13, which is substantially the position of Fig. 3. In this position practically no weight is lifted by the user. In further movement of the truck from the position of Fig. 3 the rear wheels 22 run rearwardly along the top 26 of the step while the front wheels 21 run up the vertical wall 25. This action tends to swing the carriage backwardly in the opposite direction or clockwise, as viewed in the drawing about the pivots 17, and the forward wheels resting against the upright wall of the step prevent the truck quickly running back on the top wall of the step and ending up with a bang of the wheels against the vertical wall 27 of the next step. The carriage is thus again substantially horizontal and the same action is repeated in going over the second step, and so on. It will be apparent that the truck will run up the steps with a steady uniform motion and without any jerks or jars to injure the truck or the load, or to spill the contents of the can, and the lifting action as above described greatly reduces the pull or the lift which must be exerted by the user, thus requiring much less effort to carry the weight up the steps. The device is equally adapted for running down the steps, as the action in this direction is a smooth uniform action.

Having thus set forth the nature of my invention, what I claim is:

1. In a hand truck, a body for carrying the load, handles for said body, a carriage pivoted to the body, a support on the carriage for the body forwardly of said pivot to limit forward turning movements of the body about said pivot, and supporting wheels carried by the carriage forwardly and rearwardly of said pivot.

2. In a hand truck, a body for carrying the load, handles for said body, a carriage comprising side members pivoted to said body intermediate the ends of said members, a connection extending between said side members forwardly of said pivot and forming a support for the body to limit forward turning movement of the body about said pivot, and supporting wheels carried by said carriage both forwardly and rearwardly of said pivot.

3. In a hand truck, a body comprising spaced members having substantially horizontally extending portions and upright portions having handles, transverse members connecting said first members, a carriage comprising a frame pivoted to said horizontal portions, a portion of said frame forming a support for the body forwardly of said pivot to limit forward turning movement of the body about the pivot, and supporting wheels mounted on the carriage both forwardly and rearwardly of the pivot.

4. In a hand truck, a body having a substantially horizontal portion to carry the load and upright handles, a substantially rectangular supporting carriage pivoted to said horizontal portion on transverse pivots, and two pairs of wheels mounted on said carriage, one pair of wheels being located forwardly of said pivots and the other pair being located rearwardly thereof, a portion of the carriage forming a support for the body forwardly of the pivots and arranged to limit forward turning movement of the body about said pivots.

5. In a hand truck, a body forming a support for the load, upright handles for said body, a carriage for supporting the body, forward and rearward supporting wheels for said carriage arranged to swing bodily about a pivot between said wheels, and cooperating means on the carriage and body to limit forward turning movements of the body on the carriage.

In testimony whereof I affix my signature.

BENJAMIN F. WALKER.